(12) United States Patent
Dwyer et al.

(10) Patent No.: US 12,105,340 B1
(45) Date of Patent: Oct. 1, 2024

(54) CABLE INSTALLATION USING PARACHUTE

(71) Applicant: Amazon Technologies, Inc., Seattle, WA (US)

(72) Inventors: Seth Dwyer, Seattle, WA (US); Kristofer Thomas Ivarson, Mount Vernon, WA (US); Shirley Elizabeth Ball, Greer, SC (US); John Schultz, Saint Paul, MN (US)

(73) Assignee: Amazon Technologies, Inc., Seattle, WA (US)

( * ) Notice: Subject to any disclaimer, the term of this patent is extended or adjusted under 35 U.S.C. 154(b) by 482 days.

(21) Appl. No.: 17/473,802

(22) Filed: Sep. 13, 2021

(51) Int. Cl.
*G02B 6/44* (2006.01)
*G02B 6/46* (2006.01)
*G02B 6/52* (2006.01)
*H02G 1/08* (2006.01)

(52) U.S. Cl.
CPC .............. *G02B 6/52* (2013.01); *G02B 6/4459* (2013.01); *G02B 6/475* (2023.05); *H02G 1/086* (2013.01)

(58) Field of Classification Search
CPC ........ G02B 6/4459; G02B 6/475; G02B 6/50; G02B 6/502; G02B 6/52; G02B 6/54; G02B 6/545; H02G 1/086
See application file for complete search history.

(56) References Cited

U.S. PATENT DOCUMENTS

| 5,480,203 | A | * | 1/1996 | Favalora | B25B 25/00 24/115 N |
| 6,666,434 | B2 | * | 12/2003 | Humphrey | G02B 6/4465 254/134.3 R |
| 6,974,169 | B1 | * | 12/2005 | Upton | G02B 6/545 254/134.3 FT |
| 9,657,869 | B2 | * | 5/2017 | Spijker | G02B 6/502 |
| 2014/0353561 | A1 | * | 12/2014 | Chen | H02G 1/081 254/134.3 CL |

FOREIGN PATENT DOCUMENTS

| JP | 03276104 A | * 12/1991 | ........... G02B 6/4463 |
| JP | 06121425 A | * 4/1994 | ........... G02B 6/4464 |

OTHER PUBLICATIONS

Horii et al. English Translation for JP 06121425 A, one page (Year: 1994).*

* cited by examiner

*Primary Examiner* — Daniel Petkovsek
(74) *Attorney, Agent, or Firm* — Kilpatrick Townsend & Stockton LLP

(57) ABSTRACT

A cable-jetting installation sleeve can be used to advance a fiber-optic cable through a conduit. The cable-jetting installation sleeve can include a housing and an expandable section. The expandable section can include an opening which can be expanded to receive or remove an end of the cable and contracted to engage the cable with the expandable section. A parachute can be positioned on one end of the cable-jetting installation sleeve. The parachute can be pushed by compressed air in the conduit to advance the cable-jetting installation sleeve through the conduit.

20 Claims, 5 Drawing Sheets

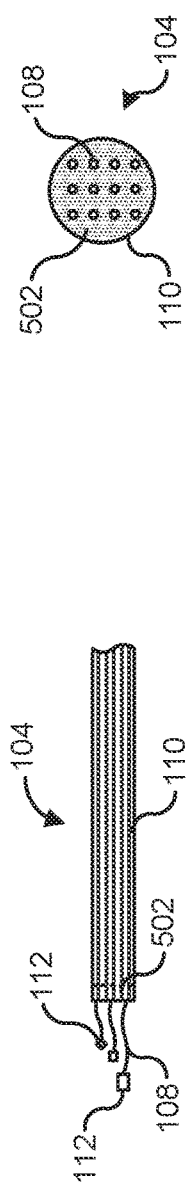
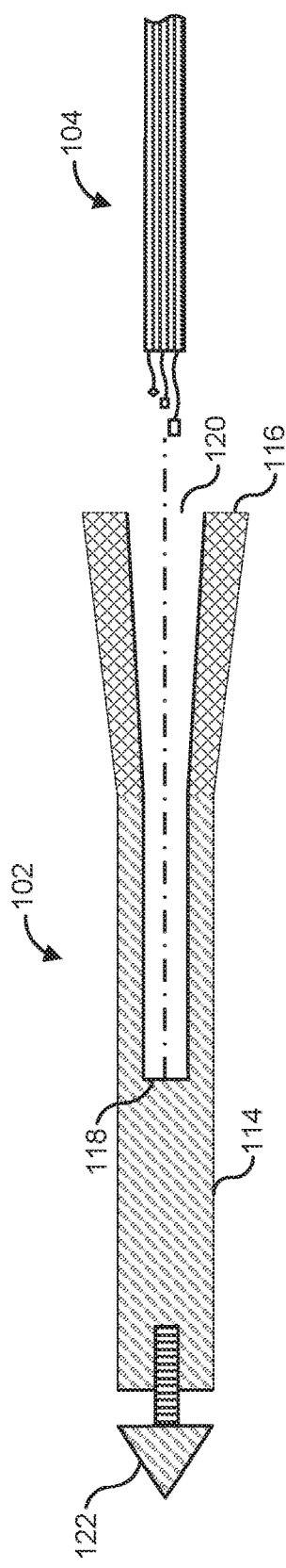
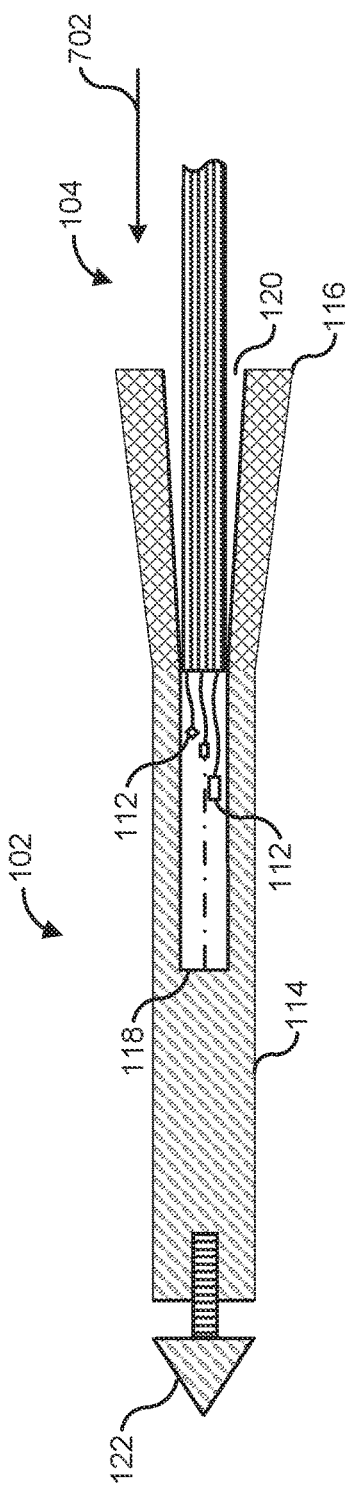
FIG. 5A
FIG. 5B
FIG. 6
FIG. 7

CABLE INSTALLATION USING PARACHUTE

BACKGROUND

Datacenters house collections of servers and networking hardware, including switches and routers. Often cables, for example fiber cables, are used to connect the components. The cables can be installed by pulling the cables into place or using cable jetting. However, using these installation methods can put pressure on the end of the cable, which can damage the end portion of the cable. For example, once the cable is installed, the end of the cable is typically cut off before splicing the cable with another cable or installing one or more connectors. Installing a connector after the cable has been installed can make precise calibration of the connector difficult.

BRIEF DESCRIPTION OF THE DRAWINGS

Various embodiments in accordance with the present disclosure will be described with reference to the drawings, in which:

FIGS. 5A through 10 illustrate various states of components that may be implemented in a simplified example process for installing a cable that can be used with the cable installation system of FIG. 1.

DETAILED DESCRIPTION

Figure 1:
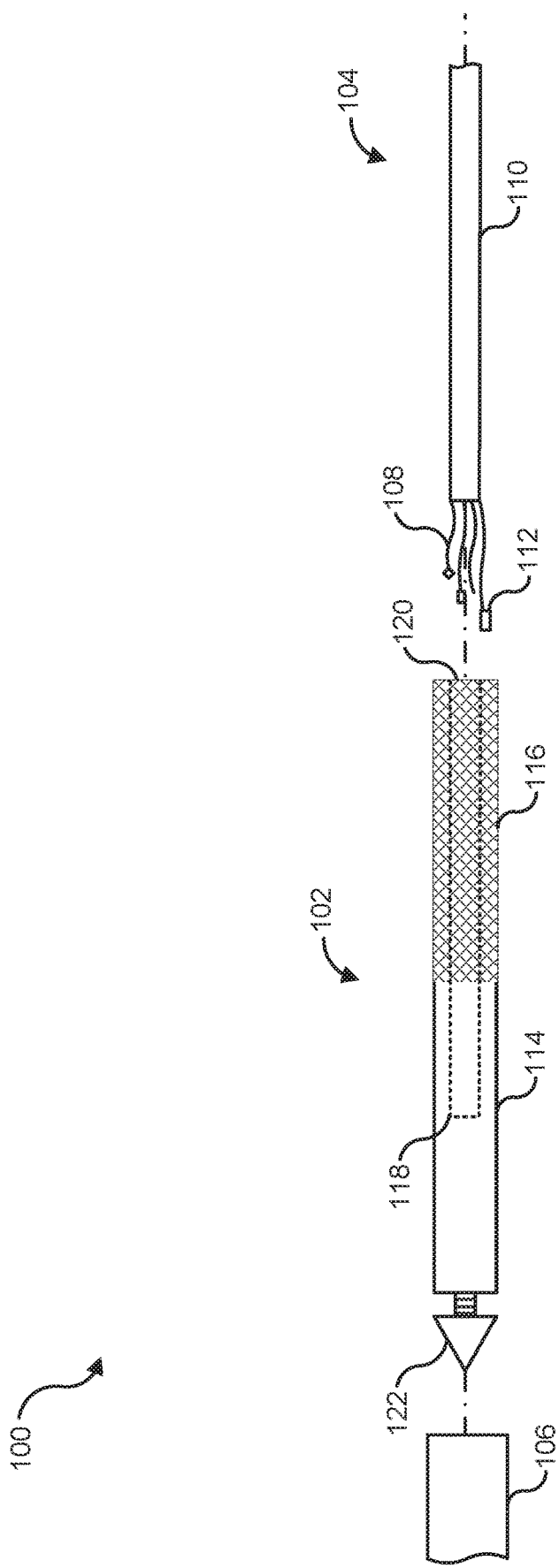
FIG. 1 illustrates an example cable installation system including an installation sleeve, according to various embodiments.

Among other things, examples herein are directed to systems and techniques relating to a cable-jetting installation for installing cables (e.g., optical-fiber cable) in a conduit. The techniques described herein may be implemented by any suitable cable-jetting system, but particular examples are described that include a cable-jetting installation sleeve. The cable-jetting installation sleeve can receive a portion (e.g., the end) of a cable, for example, within a housing defined by the sleeve. One end of the housing can be attached to an expandable section. The expandable section can include an opening that can expand to receive the cable and contract to hold the cable in place (e.g., keep the end of the cable in the interior volume). The other end of the housing can be attached to a parachute (e.g., a shuttle). The parachute can aid in the installation of the cable. For example, the parachute can capture air flowing through the conduit to pull the cable through the conduit.

Turning now to a particular example, a cable-jetting installation system can include a cable-jetting installation sleeve. The cable-jetting installation sleeve can include a housing with an interior volume. The interior volume can receive an end of a fiber-optic cable. The end of the fiber-optic cable can be a terminated end (e.g., spliced, connectorized, and/or sealed). The housing can be connected to an expandable section. The expandable section can include woven material forming an opening. The opening can expand to receive the end of the fiber-optic cable (e.g., the opening can expand to be larger than the fiber-optic cable) and can contract to hold the fiber-optic cable in place (e.g., to hold the end of the fiber-optic cable in the interior volume of the cable-jetting installation sleeve). The cable-jetting installation sleeve can also include a threaded connection for receiving a parachute. The parachute can include a threaded portion that can engage with the threaded connection. The parachute can aid in installing the fiber-optic cable in a conduit. After the fiber-optic cable has been installed in the conduit (e.g., once a portion of the fiber-optic cable has emerged from a downstream end of the conduit), the opening of the expandable section can be expanded and the end of the fiber-optic cable can be removed from the interior volume of the cable-jetting installation sleeve. For example, removing the cable-jetting installation sleeve may expose the connectorized end or terminated end of the fiber-optic cable in a state ready for connection with other components and/or without incurring additional time or difficulties of performing splicing, mounting the connector to the cable end, or other procedures for suitably terminating the cable end.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Turning now to the figures, FIG. 1 illustrates an example cable-jetting installation system 100 including an installation sleeve 102 (e.g., a cable-jetting installation sleeve 102). The installation sleeve 102 can receive a portion of a cable 104 (e.g., a fiber-optic cable, a wire cable, and/or another type of cable). For example, the installation sleeve 102 can receive an end of the cable 104. The installation sleeve 102 and the cable 104 can be fed through a conduit 106 (e.g., until emerging from a downstream part of the conduit and/or until the cable is in an installed position). For example, the end of the cable 104 can be positioned in the installation sleeve 102 and the installation sleeve 102 and the cable 104 can be fed through the conduit 106.

The cable 104 can be or include an optical-fiber cable (e.g., a fiber-optic cable). For example, the cable 104 can include one or more optical-fiber elements 108 that are used to carry light. In some embodiments, the cable 104 can additionally or alternatively include strength members. For example, the strength members can run along the length of the cable 104. The strength members can be or include aramid yarn, fiber glass, metallic shielding, or any suitable rigid or semi-rigid material.

The cable 104 can include a protective casing 110 surrounding the optical-fiber elements 108. The protective casing 110 can be or include a rigid or semi-rigid material that can allow the cable 104 to move through the conduit 106 (e.g., a curved conduit 106). For example, the protective casing 110 can include aramid yarn, plastic, metal, woven material, carbon fiber, fiber glass, and/or any suitable rigid or semi-rigid material.

In various embodiments, the cable 104 can be or include multiple optical-fiber elements 108 that can be bundled together and surrounded by the protective casing 110. The cable 104 can have a diameter between 0.1 inches and 3 inches, inclusive (e.g., 0.1 inches, 0.5 inches, 1 inch, 1.5 inches, 2 inches, and/or 3 inches).

In various embodiments, one or more of the optical-fiber elements 108 can extend beyond the protective casing 110. The portion of the optical-fiber element 108 that extends beyond the protective casing 110 can include a terminated end (e.g., a factory termination at the end of the optical-fiber elements 108). In various embodiments, the portion of the optical-fiber element 108 that extends beyond the protective casing 110 can be up to 6 meters (19.685 feet) in length. In some embodiments, connectors 112 can be attached to the end of the optical-fiber elements 108 (e.g., the optical-fiber elements 108 can be connectorized). The connectors 112 can be positioned and/or calibrated prior to the cable 104 arriving at an installation location. For example, the connectors 112 can be attached before the cable 104 is moved to the installation location. The connectors 112 can be or include a straight tip connector, a fiber channel connector, a ferrule connector, a square connector, a standard connector, a subscriber connector, a miniature unit connector, a mechanical transfer connector, a registered jack connector, a little connector, a lucent connector, a local connector, a multi-fiber connector, a multimode connector, a single mode connector, LC, SC, Simplex, Duplex, MPO, Multi-fiber ferrule, lensed ferrules, or any suitable fiber optic connector and/or mechanical splice.

The installation sleeve 102 can include a housing 114 connected to an expandable section 116. In some cases, the installation sleeve 102 can have a length up to 10 meters (24.6 feet). For example, in some embodiments, the housing 114 can have a length of 6 meters and the expandable section 116 can have a length of 1 meter (3.2 feet). The housing 114 and/or the expandable section 116 can include a cavity 118 which can receive a portion of the cable 104 (e.g., an end of the cable 104). The end of the cable 104 can be positioned in the cavity 118 via an opening 120 in the expandable section 116. For example, the cavity 118 can extend from the opening 120 to the end of the housing 114. However, the cavity 118 may extend a portion that is less than an entirety of the length of the housing 114. The cavity 118 can have a length that is greater than or equal to the length of the portion of the optical-fiber element 108 that extends beyond the protective casing 110 (e.g., greater than or equal to 6 meters (19.685 feet)). The opening 120 can expand and/or contract. For example, the opening 120 can be expanded to receive the cable 104 and contract to hold the cable 104 in place after the end of the cable 104 has been inserted into the cavity 118.

In various embodiments, the installation sleeve 102 can include a parachute 122 (e.g., a shuttle). The parachute 122 can aid in feeding the cable 104 through the conduit 106. For example, parachute 122 can be used with cable-jetting to feed the cable 104 through the conduit 106. The parachute 122 can be made of or include plastic, metal, and/or any suitable material. The parachute 122 can include a surface where a portion of the air flowing through the conduit 106 can apply a force to the parachute 122 to move the cable 104 through the conduit 106. However, in some embodiments, the installation sleeve 102 may not include a parachute 122 and/or a similar device to aid in feeding the cable 104 through the conduit 106.

The parachute 122 can be used to feed the cable 104 through the conduit 106 without having to connect the parachute 122 and/or the installation sleeve 102 with a pulling cable. For example, in some known systems, a pulling cable can be attached to the installation sleeve 102 to pull the cable 104 through the conduit 106. However, using a pulling cable can increase the force on the cable 104 which can damage the cable 104. Additionally, pulling the cable 104 through the conduit 106 can use additional machinery (e.g., a pulling device). The parachute 122 can aid in pulling the cable 104 through the conduit 106 without putting additional stress on the cable 104 and/or needing additional machinery during installation.

The conduit 106 can be or include a tube (e.g., a plastic or metal tube), for example, in a datacenter. The conduit 106 can be straight and/or curved and define a path for feeding the cable 104. The cable 104 can be fed through the conduit using, for example, cable jetting. For example, compressed air can be injected into the conduit 106 and the installation sleeve 102 and the cable 104 can be fed through the conduit 106. In some embodiments, the conduit 106 can have a diameter that is larger than the diameter of the cable 104 and/or the installation sleeve 102. For example, the cable 104 and/or the installation sleeve 102 can have a diameter that is between 70% and 85% the diameter of the conduit 106.

Figure 2:
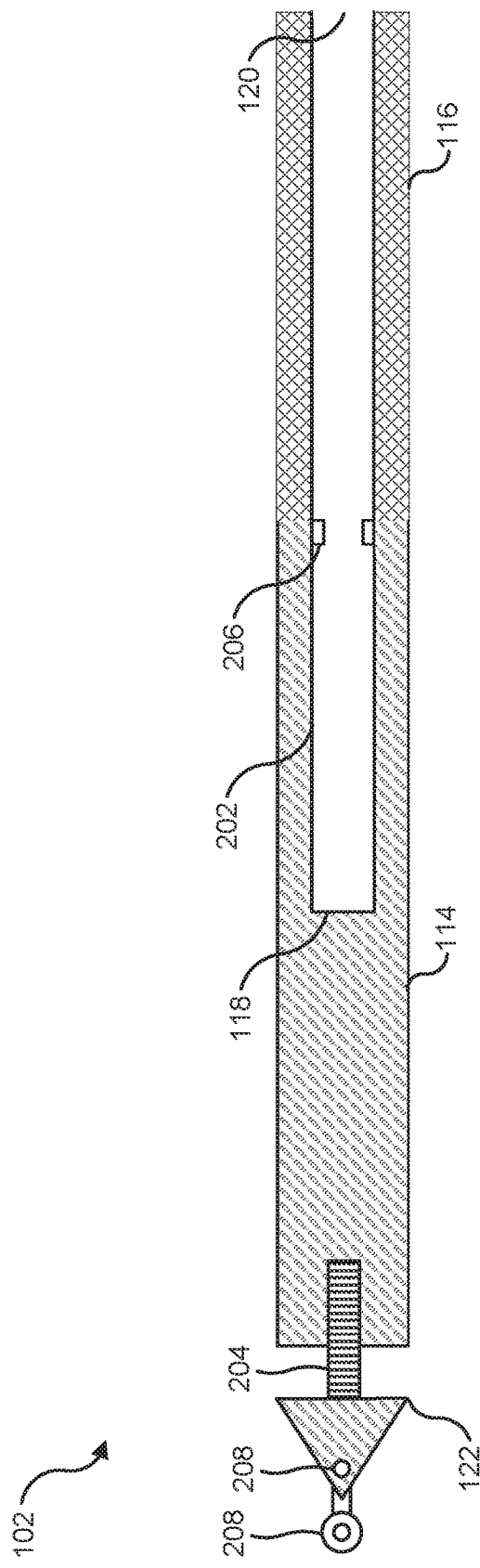
FIG. 2 is a cross-sectional side view of an example installation sleeve for use with the example cable installation system of FIG. 1 in an installation configuration, according to various embodiments.
Figure 3:
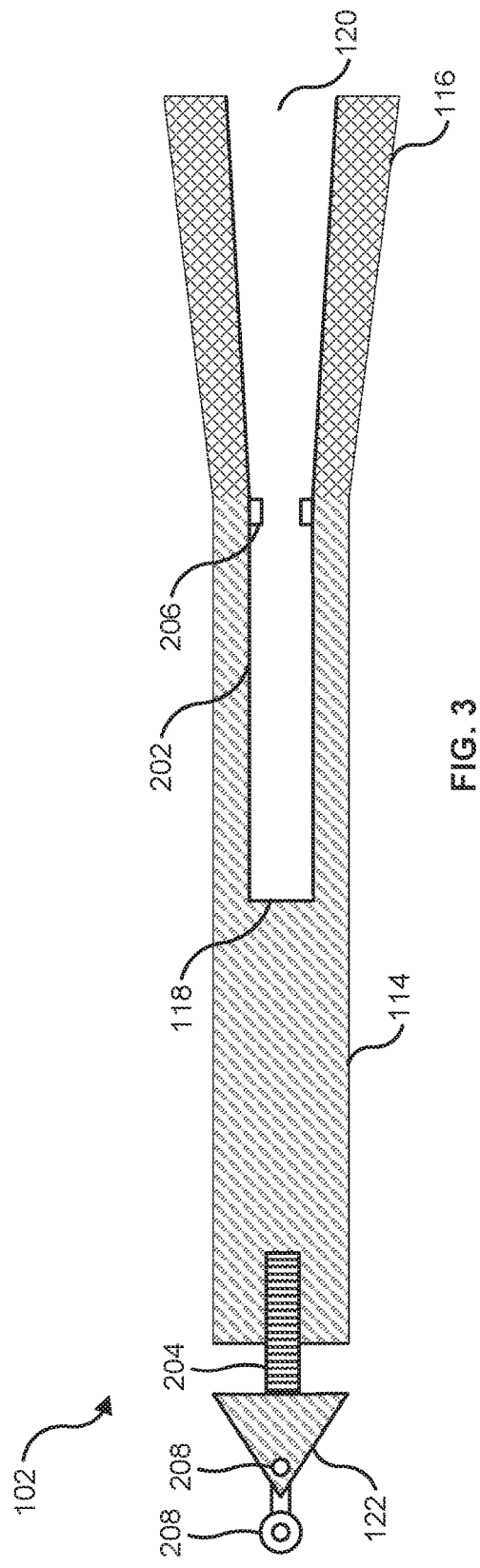
FIG. 3 is a cross-sectional side view of the example installation sleeve of FIG. 2 in an adjustment configuration, according to various embodiments.

Turning to FIGS. 2 and 3, cross-sectional side views of an example installation sleeve 102 are shown. FIG. 2 shows the installation sleeve 102 in an installation configuration (e.g., in a configuration where the installation sleeve 102 and/or the cable 104 can be fed through the conduit 106). FIG. 3 shows the installation sleeve 102 in an adjustment configuration for receiving and/or removing the cable 104 (e.g., in a configuration where the end of the cable can be inserted into, removed from, and/or otherwise positioned into or out of cavity 118).

The expandable section 116 can be moved to expand and/or contract the opening 120. For example, the expandable section 116 can include a woven mesh (e.g., a cylindrical, helically wound braid) that can be compressed to expand the opening 120 and extended to contract the opening 120. The expandable section 116 can be or include a biaxial braid, mesh, metal, plastic, fabric, carbon fiber, and/or any suitable woven or weaveable material.

As shown in FIG. 2, the end of the expandable section 116 can be moved away from the housing 114 to contract the opening 120 (e.g., lengthening the expandable section 116 can reduce the angle between the threads of the woven mesh at their crossing points, which can reduce the radial distance between opposing sides). For example, the opening 120 can contract until an interior surface of the expandable section 116 contacts (e.g., engages with) the cable 104 (e.g., the protective casing 110 of the cable 104).

As shown in FIG. 3, the end of the expandable section 116 can be moved toward the housing 114 to expand the opening 120 (e.g., shortening the expandable section 116 can increase the angle between the threads of the woven mesh at their crossing points, which can increase the radial distance between opposing sides). The opening 120 can be expanded to be larger than the cable 104 (e.g., the expanded opening 120 can have a diameter that is larger than the diameter of the cable 104).

The cavity 118 can extend through the expandable section 116 and along a length of the housing 114. For example, the cavity 118 can extend a portion of the length of the housing 114, however, the cavity 118 may extend the entire length of the housing 114. In some embodiments, where the cavity 118 extends along a portion of the length of the housing 114, the housing can be filled with material (e.g., can be solid). However, the housing 114 may be partially filled with material (e.g., may have an opening that is connected to and/or separate from the cavity 118).

In various embodiments, the cavity 118 can be or include a cushioning material. For example, the interior surface 202 of the cavity 118 can include foam and/or similar cushioning material. The cushioning material can help protect the connectors 112 when the end of the cable 104 is positioned in the cavity 118.

In some embodiments, the cavity 118 can include a seal 206 positioned on the interior surface 202. The seal 206 can prevent or reduce air from flowing into the cavity 118 (e.g., between the cable 104 and the interior surface 202 of the cavity 118). The seal 206 can be or include an elastic material that can accommodate different sized cables 104. For example, the seal 206 can have an opening that is smaller than the diameter of the smallest cable 104 and compress to accommodate the cable 104. The seal 206 may be removable such that a different seal 206 (e.g., with a different diameter and/or different material) can be positioned on the interior surface 202. The seal 206 can be or include a gasket, rubber, silicone, and/or any suitable material for forming a seal between the cable 104 and the interior surface 202.

In further embodiments, the parachute 122 can include a connecting section 204. The connecting section 204 can connect the end of the parachute 122 and the housing 114. The connecting section 204 can have a smaller diameter than the diameter of the installation sleeve 102. For example, in embodiments where cable-jetting is used to feed the cable 104 through the conduit 106, the connecting section 204 can allow air to flow behind a portion of the parachute 122 to aid in pulling the parachute 122 through the conduit 106. The connecting section 204 can have a uniform cross-section (e.g., the entire cross-section of the connecting section 204 can be smaller than the cross-section of the installation sleeve 102). However, the connecting section 204 may additionally or alternatively include a non-uniform cross-section (e.g., a portion of the cross-section of the connecting section 204 may be the same size or larger than the cross-section of the installation sleeve 102.

The parachute 122 may define a rear-ward facing surface with an area on which the air flowing through the conduit 106 can press to apply a force for driving the parachute 122 forward through the conduit 106, for example. The parachute 122 can be solid or may have a hollow portion.

In some embodiments, the parachute 122 can include openings. The openings can allow air flowing through the conduit 106 to flow into a portion of the parachute 122 and apply a force for driving the parachute 122 forward through the conduit 106.

In various embodiments, the connecting section 204 can be threaded. For example, the connecting section 204 can be threaded into a receiving portion of the housing 114. The connecting section 204 can be adjusted to change the distance between the parachute 122 and the end of the housing 114. For example, the connecting section 204 can be screwed into the housing 114 differing amounts to change the distance between the end of the housing 114 and the parachute 122.

In some embodiments, the parachute 122 can be sized and/or shaped to expand dented portions of the conduit 106. For example, the parachute 122 can have a wedge shape that can expand a dented section of the conduit 106 to allow the cable 104 to travel through the conduit 106. Additionally or alternatively, the parachute 122 can be or include material that can allow the parachute 122 to expand the dented section. For example, the parachute 122 can be or include metal. A wedge shape for the parachute 122 can additionally or alternatively provide one or more ramped surfaces that may facilitate guiding of the installation sleeve 102 around corners, curves, and/or bends that may be present in the conduit 106.

In various embodiments, the parachute 122 can include an attachment point 208. The attachment point 208 can be used to attach a pulling cable. The pulling cable can be used to help move the installation sleeve 102 and the cable 104 through the conduit 106. For example, the pulling cable can be attached to the attachment point 208 and used to pull the installation sleeve 102 and the cable through the conduit 106. The attachment point 208 can be or include an opening in the parachute 122, however, the attachment point 208 can be or include a device that attaches to the parachute 122. The attachment point 208 can be or include a hook, a loop, and/or any suitable connection device.

Figure 4:
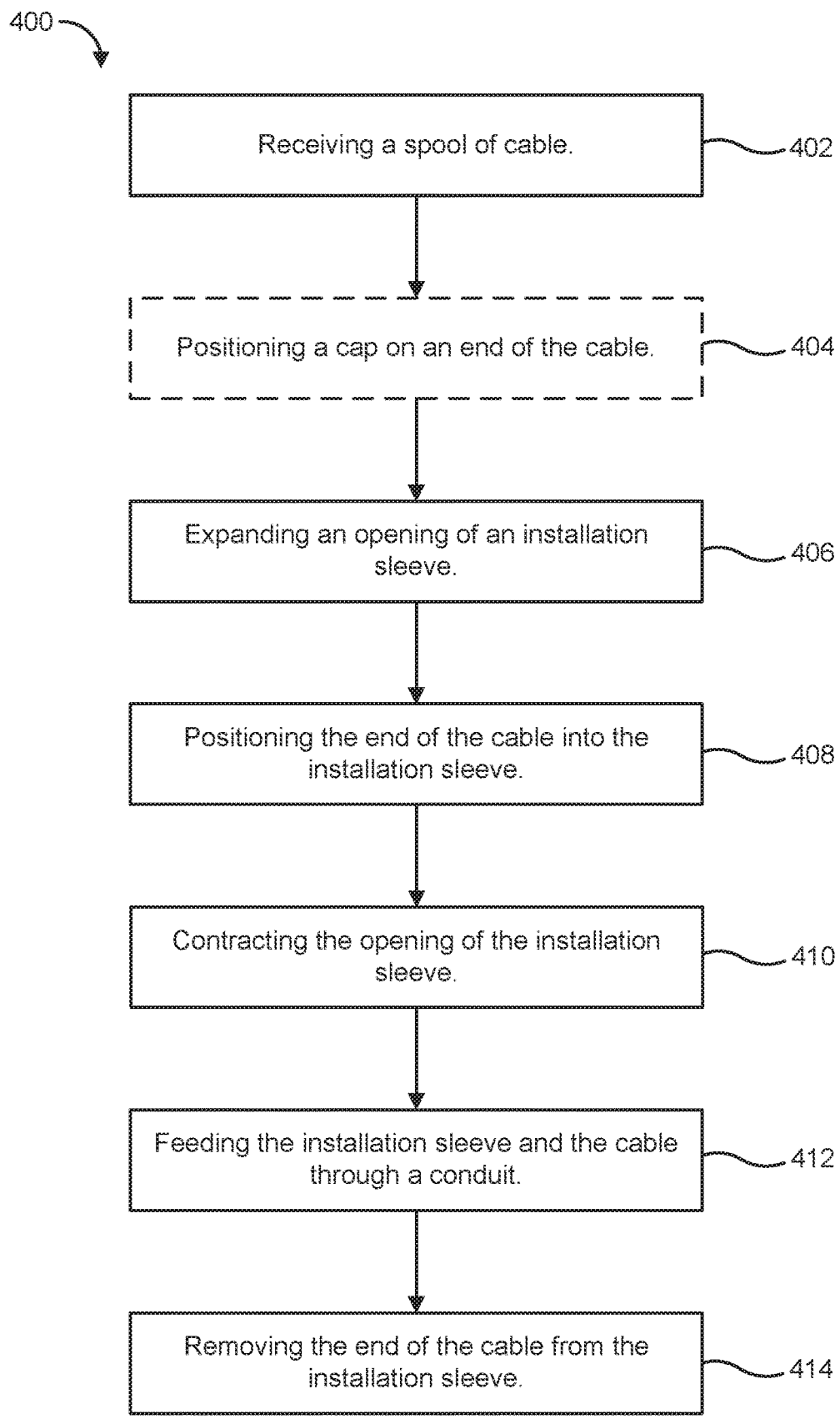
FIG. 4 is a flowchart illustrating a process for installing a cable using the cable installation system of FIG. 1, according to various embodiments.

Turning now to FIG. 4, a flowchart illustrating a process 400 for feeding a cable (e.g., cable 104) through a conduit (e.g., conduit 106) using a cable-jetting installation system (e.g., a cable-jetting installation system 100) is shown. Various blocks of the process 400 are described by referencing the components shown in FIGS. 5A through 10, however, additional or alternative components may be used with the process 400. FIGS. 5A through 10 illustrate the example process 400 using particular embodiments of the cable-jetting installation system 100 of FIG. 1.

The process 400 at block 402 can include receiving a spool of cable 104. The cable 104 can include one or more optical-fiber elements (e.g., optical-fiber elements 108) surrounded by a protective casing (e.g., protective casing 110). The spool of cable 104 can be received at an installation location. For example, the spool of cable 104 can be received at a datacenter containing one or more conduits (e.g., conduits 106) for receiving the cable 104.

In various embodiments, some or all of the optical-fiber elements 108 can extend beyond the end of the protective casing 110. Additionally or alternatively, some or all of the optical-fiber elements 108 can include a connector (e.g., connector 112). The connectors 112 can be attached to the optical-fiber elements 108 prior to the spool of cable 104 being received. For example, the connectors 112 can be attached and calibrated and/or tested at a manufacturing facility. However, the connectors 112 may be connected to the optical-fiber elements 108 after the spool of cable 104 is received (e.g., at the installation location).

In some embodiments, the process 400 at block 404 can include sealing the end of the cable 104 (e.g., at the end of the protective casing 110). For example, the cable 104 can be sealed by a plug 502. FIGS. 5A and 5B illustrate the plug 502 positioned at the end of the protective casing 110. The plug 502 can seal the cable 104 and prevent air and/or debris from flowing into the cable 104. The plug 502 can seal the area between the protective casing 110 and the optical-fiber elements 108. For example, the plug 502 can prevent air from entering the cable 104 and damaging the casing and/or the optical-fiber elements 108.

The plug 502 can extend a length into the cable 104. For example, the plug 502 can extend between 0.5 inches and 2 inches into the cable 104. The plug 502 can be or include metal, corrugate, urethane, epoxy, resin, plastic, and/or any suitable material for sealing the end of the cable 104.

The process 400 at block 406 can include expanding an opening (e.g., opening 120) of an installation sleeve (e.g., installation sleeve 102). FIG. 6 illustrates the expanded opening 120 of the installation sleeve 102. The opening 120 can be in an end of an expandable section (e.g., expandable section 116). The end of the expandable section 116 can be moved toward the housing 114 (e.g., shortened) to expand the opening 120. The opening 120 can be expanded to be larger than the cable 104 (e.g., the diameter of the opening 120 can be larger than the diameter of the cable 104).

The process 400 at block 408 can include positioning the end of the cable 104 into the installation sleeve 102. FIG. 7 illustrates the cable 104 inserted in the installation sleeve 102. The end of the cable 104 can be inserted into a cavity (e.g., cavity 118) of the installation sleeve 102, for example, through opening 120, such as illustrated by arrow 702. For example, the connectors 112 and/or the end of the optical-fiber elements 108 can be positioned in the cavity 118.

Figure 8:
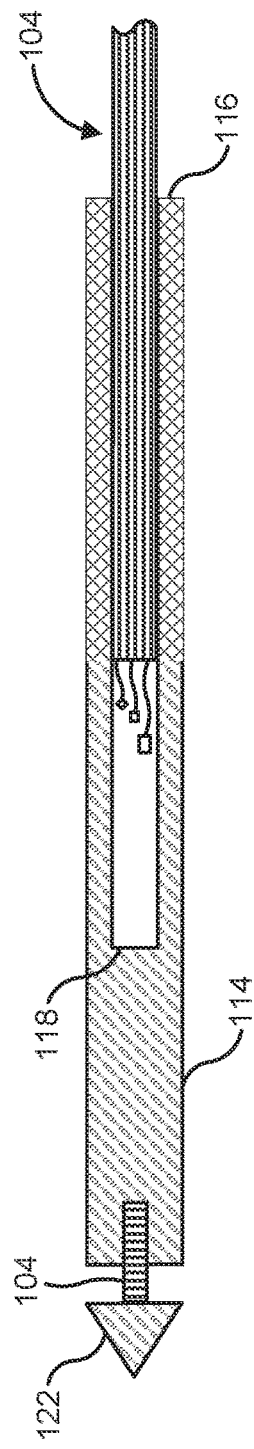

The process 400 at block 410 can include contracting the opening 120 of the installation sleeve 102. FIG. 8 illustrates the opening 120 contracted around the cable 104. The opening 120 can contract by moving an end of the installation sleeve 102 away from the housing 114, for example. The opening 120 can contract until an interior surface of the expandable section 116 contacts the cable 104 (e.g., until the expandable section contacts the protective casing 110). In some embodiments, the expandable section 116 can be further secured to the cable 104. For example, an adhesive strip, clamp ring, or other fastener can be used to secure the end of the expandable section 116 with the cable 104.

Figure 9:
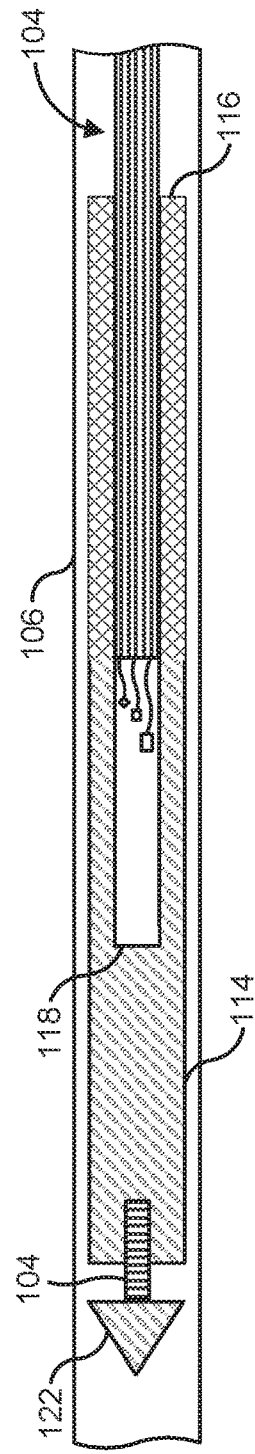

The process 400 at block 412 can include feeding the installation sleeve 102 and the cable 104 through the conduit 106. FIG. 9 illustrates the installation sleeve 102 and the cable 104 in the conduit 106. The installation sleeve 102 and the cable 104 can be fed through the conduit 106 using, for example, cable jetting. The installation sleeve 102 and the cable 104 can be fed through the conduit 106 until the cable 104 is in the desired installation position. For example, the installation sleeve 102 and/or the cable 104 can be fed through the entire length of the conduit 106. However, the installation sleeve 102 and/or the cable 104 may be fed through a portion of the length of the conduit 106.

Figure 10:
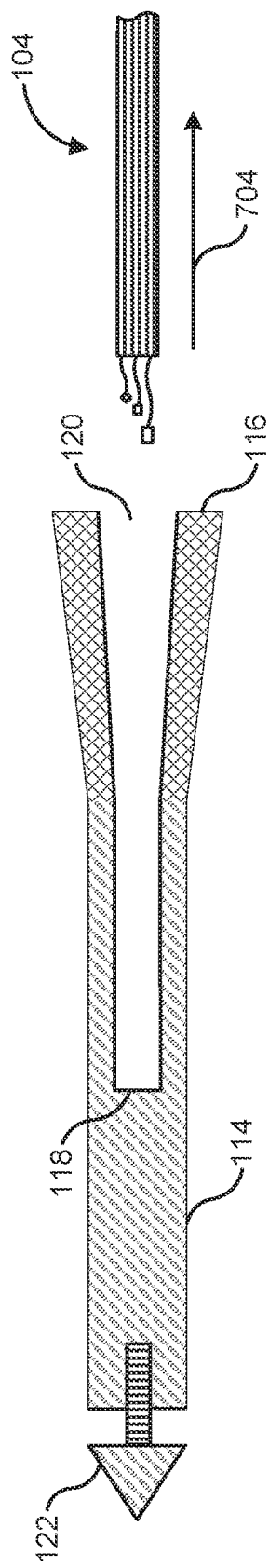

The process 400 at block 414 can include removing the end of the cable 104 from the installation sleeve 102. FIG. 10 illustrates the cable 104 after the cable 104 has been removed from the installation sleeve 102. The opening 120 can be expanded until the opening 120 is larger than the cable 104. The cable 104 can then be removed from (e.g., pulled out of) the installation sleeve 102 (e.g., out of the cavity 118). For example the cable 104 can be removed from the installation sleeve 102, as illustrated by arrow 704. Removing the cable 104 may expose the connectors 112 or terminated end of the optical-fiber elements 108 in a state ready for connection with other components and/or without incurring additional time or difficulties of performing splicing, mounting the connector 112 to the end of the cable 104, or other procedures for suitably terminating the end of the cable 104.

In various embodiments, one or more steps (e.g., blocks 402 through 414) of the process 400 can be repeated. For example, a second cable 104 can be inserted into the installation sleeve 102 and fed through the conduit 106. Re-using the installation sleeve 102 (e.g., with a second cable 104) and/or repeating steps can reduce costs and materials associated with installing a cable 104 in a conduit 106. For example, an installation sleeve 102 that can be re-used to install multiple cables 104 reduces material, costs, and/or an environmental impact compared with installation devices that can only be used once (e.g., with one cable) and then are discarded.

Additionally or alternatively, using an installation sleeve 102 to install the cable 104 can save time and/or materials by being able to connect the cable 104 without needing to cut and/or alter the end of the cable 104. For example, in traditional air jetting systems that don't utilize an installation sleeve 102, the end of the cable 104 can be damaged, requiring the end of the cable 104 to be removed (e.g., cut off). However, by using the installation sleeve 102 with an air jetting system, the end of the cable 104 can be protected. Once the cable 104 is removed from the installation sleeve 102, the cable 104 can be readily connected (e.g., with another cable 104 and/or one or more connectors 112) without needing to alter the end of the cable 104.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of installing a fiber-optic cable, comprising:
receiving the fiber-optic cable;
expanding an opening defined by an expandable section of an installation sleeve that further includes a housing having a leading end with a threaded receiving portion, the housing further having a trailing end with a passage into an interior cavity;
inserting a proximal end of the fiber-optic cable through the opening into the interior cavity defined by the installation sleeve;
contracting the opening to engage an interior surface of the expandable section with an exterior surface of the fiber-optic cable; and
with the fiber-optic cable inserted into the installation sleeve, feeding the installation sleeve and the fiber-optic cable through a conduit by injecting compressed air into the conduit to engage with a parachute having a threaded connecting section coupled with the threaded receiving portion of the housing of the installation sleeve such that a distance between the leading end of the housing and the parachute is adjustable by screwing in the threaded connecting section into the threaded receiving portion of the housing by differing amounts and thereby cause movement of the fiber-optic cable through the conduit.

2. The method of claim 1, further comprising: after the installation sleeve emerges from a downstream portion of the conduit, expanding the opening of the expandable section of the installation sleeve; and
removing the fiber-optic cable from the interior cavity of the installation sleeve.

3. The method of claim 1, wherein expanding the opening comprises shortening the expandable section to cause an increase in a diameter of the opening.

4. The method of claim 3, wherein contracting the opening comprises lengthening the expandable section to cause a decrease in the diameter of the opening.

5. The method of claim 1, further comprising inserting a portion of the parachute into a receiving portion of the installation sleeve.

6. The method of claim 1, wherein the fiber-optic cable is a first fiber-optic cable and the method further comprises:
removing the first fiber-optic cable from the interior cavity defined by the installation sleeve;
receiving a second fiber-optic cable;
expanding the opening;
inserting the proximal end of the second fiber-optic cable through the opening into the interior cavity defined by the installation sleeve; and
contracting the opening to engage the interior surface of the expandable section with an exterior surface of the second fiber-optic cable.

7. The method of claim 1, wherein the parachute further comprises a metal wedge, and wherein the method further comprises expanding a dented portion of the conduit in response to contact with the metal wedge during feeding of the parachute through the conduit with the injected compressed air.

8. A cable-jetting installation system, comprising:
a cable; and
an installation sleeve advanceable through a conduit in response to movement of compressed air injected into the conduit when the installation sleeve is coupled with the cable and positioned in the conduit, the installation sleeve comprising:
a housing having a leading end with a threaded receiving portion, the housing further having a trailing end defining a passage into an interior cavity, the interior cavity configured to receive an end of the cable;
an expandable section coupled with the housing and defining an opening, the opening expandable to receive the cable and contractable to engage an interior surface of the expandable section with an exterior surface of the cable; and
a parachute having a threaded connecting section coupled with the threaded receiving portion of the housing such that a distance between the leading end of the housing and the parachute is adjustable by screwing in the threaded connecting section into the threaded receiving portion of the housing by differing amounts, the parachute defining a surface where the compressed air in the conduit can push the parachute to advance the installation sleeve through the conduit.

9. The cable-jetting installation system of claim 8, wherein the cable is connectorized.

10. The cable-jetting installation system of claim 8, wherein the installation sleeve has a diameter that is less than a diameter of the conduit.

11. The cable-jetting installation system of claim 8, wherein the expandable section comprises a woven mesh.

12. The cable-jetting installation system of claim 8, wherein the cable comprises a plurality of fiber-optic elements at least partially surrounded by a protective casing.

13. The cable-jetting installation system of claim 8, further comprising a plug positioned within an end of the cable, the plug sealing the end of the cable and preventing air from flowing into the cable.

14. The cable-jetting installation system of claim 8, wherein when the opening is expanded, a diameter of the opening is larger than a diameter of the cable.

15. A cable-jetting installation sleeve positionable in a conduit and advanceable through the conduit by cable-jetting, the cable-jetting installation sleeve comprising:
a housing having a leading end with a threaded receiving portion, the housing further having a trailing end defining a passage into an interior cavity, the interior cavity configured to receive an end of a cable;
an expandable section coupled with the housing and defining an opening, the expandable section moveable between an adjustment configuration where the opening is expanded to receive or remove the cable and an installation configuration where the opening is contracted to engage an interior surface of the expandable section with an exterior surface of the cable; and
a parachute having a threaded connecting section coupled with the threaded receiving portion of the housing such that a distance between the leading end of the housing and the parachute is adjustable by screwing in the threaded connecting section into the threaded receiving portion of the housing by differing amounts, the parachute configured to, when the cable-jetting installation sleeve is positioned in a conduit, be pushed by compressed air injected into the conduit to advance the cable-jetting installation sleeve through the conduit.

16. The cable-jetting installation sleeve of claim 15, wherein the interior cavity comprises padding.

17. The cable-jetting installation sleeve of claim 15, wherein a portion of the parachute has a diameter that is less than a diameter of the housing.

18. The cable-jetting installation sleeve of claim 15, wherein the parachute comprises a sloped surface.

19. The cable-jetting installation sleeve of claim 15, wherein the expandable section comprises a woven metal mesh configured to expand the opening when the expandable section is shortened and contract the opening when the expandable section is lengthened.

20. The cable-jetting installation sleeve of claim 15, wherein the parachute further comprises a metal wedge configured to facilitate expanding a dented portion of the conduit in response to contact with the metal wedge during pushing of the parachute through the conduit with the injected compressed air.

\* \* \* \* \*